United States Patent
Wangenheim et al.

(10) Patent No.: US 9,976,227 B2
(45) Date of Patent: May 22, 2018

(54) ELECTROCHEMICAL MACHINING METHOD FOR ROTORS OR STATORS FOR MOINEAU PUMPS

(71) Applicant: BAKER HUGHES INCORPORATED, Houston, TX (US)

(72) Inventors: Christoph Wangenheim, Hemmingen (DE); Gunnar Michaelis, Hambuhren (DE); Witali Huber, Laatzen (DE); Thomas Uhlenberg, Wienhausen (DE); Hans H. Wolters, Leeuwarden (NL)

(73) Assignee: Baker Hughes, a GE company, LLC, Houston, TX (US)

( * ) Notice: Subject to any disclaimer, the term of this patent is extended or adjusted under 35 U.S.C. 154(b) by 143 days.

(21) Appl. No.: 14/278,220

(22) Filed: May 15, 2014

(65) Prior Publication Data
US 2015/0329987 A1    Nov. 19, 2015

(51) Int. Cl.
| | | |
|---|---|---|
| *C25F 3/14* | (2006.01) | |
| *C25F 7/00* | (2006.01) | |
| *B23H 3/04* | (2006.01) | |
| *B23H 9/00* | (2006.01) | |
| *F04C 2/107* | (2006.01) | |

(52) U.S. Cl.
CPC .......... *C25F 3/14* (2013.01); *B23H 3/04* (2013.01); *B23H 9/003* (2013.01); *B23H 9/005* (2013.01); *B23H 9/006* (2013.01); *C25F 7/00* (2013.01); *F04C 2/1071* (2013.01); *F04C 2/1075* (2013.01); *F04C 2230/101* (2013.01)

(58) Field of Classification Search
CPC ..... C25F 3/14; C25F 7/00; B23H 3/04; B23H 9/003; B23H 9/005; B23H 9/006
See application file for complete search history.

(56) References Cited

U.S. PATENT DOCUMENTS

| | | | | |
|---|---|---|---|---|
| 3,372,099 A | * | 3/1968 | Clifford | ............ B23H 3/04 148/277 |
| 3,514,390 A | | 5/1970 | Stark et al. | |
| 3,769,184 A | | 10/1973 | Rushmere | |
| 3,786,223 A | | 1/1974 | Oconnor | |
| 4,052,284 A | | 10/1977 | Schrader | |

(Continued)

FOREIGN PATENT DOCUMENTS

| | | |
|---|---|---|
| EP | 1349693 A2 | 10/2003 |
| JP | 2013136140 | 7/2013 |
| WO | WO 2014202862 A1 * 12/2014 | ............ B23H 3/04 |

*Primary Examiner* — Nicholas A Smith
(74) *Attorney, Agent, or Firm* — Steve Rosenblatt

(57) ABSTRACT

An ECM method involves the use of a thin hollow electrode assembly that carries the electrolyte within and that is advanced relatively to the workpiece. The small profile of the electrode results in a minimal removal of metal in forming the desired rotor or stator shape. The electrode profile allows significant power consumption reduction or increased machining speed for a given rate of power input. The electrode can be a unitary ring shape or can be made of segments that are placed adjacent each other so that a continuous shape is cut. Not all the lobes of the stator or rotor have to be cut in the same pass. Electrode segments can be used to sequentially provide the desired lobe count in separate passes. The lobe shapes in the electrode can be slanted to get the desired rotor or stator pitch or they can be aligned with the workpiece axis.

31 Claims, 11 Drawing Sheets

(56) References Cited

U.S. PATENT DOCUMENTS

| | | | |
|---|---|---|---|
| 4,686,020 A | 8/1987 | Hinman | |
| 5,064,521 A | 11/1991 | Stepanenko et al. | |
| 5,149,405 A | 9/1992 | Bruns et al. | |
| 5,171,138 A | 12/1992 | Forrest | |
| 5,244,548 A | 9/1993 | Bruns et al. | |
| 5,310,468 A | 5/1994 | Bruns et al. | |
| 5,314,598 A | 5/1994 | Glew et al. | |
| 5,320,505 A | 6/1994 | Misiak et al. | |
| 5,662,783 A | 9/1997 | Cannon et al. | |
| 5,759,019 A | 6/1998 | Wood et al. | |
| 5,846,665 A | 12/1998 | Timmer et al. | |
| 6,099,715 A | 8/2000 | Frembgen | |
| 6,183,226 B1 | 2/2001 | Wood et al. | |
| 6,214,200 B1 | 4/2001 | Altena et al. | |
| 6,231,748 B1 | 5/2001 | Agafonov et al. | |
| 6,250,340 B1 | 6/2001 | Jones et al. | |
| 6,251,257 B1 | 6/2001 | Cochran | |
| 6,267,869 B1 | 7/2001 | MacLeod et al. | |
| 6,309,195 B1 | 10/2001 | Bottos et al. | |
| 6,336,796 B1 | 1/2002 | Cholet et al. | |
| 6,413,407 B1 | 7/2002 | Bruns et al. | |
| 6,464,855 B1 | 10/2002 | Chadda et al. | |
| 6,923,900 B2 | 8/2005 | Jones et al. | |
| 7,192,260 B2 | 3/2007 | Lievestro et al. | |
| 7,479,214 B2 | 1/2009 | Lievestro et al. | |
| 7,507,642 B2 | 3/2009 | Yamagata et al. | |
| 8,057,645 B2 * | 11/2011 | McGee | B23H 7/18 204/223 |
| 8,535,491 B2 | 9/2013 | Wei et al. | |
| 8,540,861 B2 * | 9/2013 | Bayer | B23H 3/00 204/224 M |
| 8,663,450 B1 * | 3/2014 | Kathe | B23H 9/14 204/224 M |
| 2007/0246372 A1 | 10/2007 | Obara et al. | |
| 2010/0170806 A1 | 7/2010 | Klopf et al. | |
| 2010/0270168 A1 | 10/2010 | Bayer et al. | |
| 2011/0116959 A1 | 5/2011 | Akbari et al. | |
| 2011/0243774 A1 * | 10/2011 | Underwood | F04C 13/008 418/48 |
| 2013/0018480 A1 | 1/2013 | Kopp | |
| 2015/0273602 A1 * | 10/2015 | Mukai | B23H 3/04 204/224 M |

\* cited by examiner

ELECTROCHEMICAL MACHINING METHOD FOR ROTORS OR STATORS FOR MOINEAU PUMPS

FIELD OF THE INVENTION

The field of this invention is electrochemical machining (ECM) and more particularly electrochemical machining of elongated parts. The elongated parts may be parts for machines to transform energy such as but not limited to pumps or motors. These machines may comprise elongated rotors or stators having a complex shape. ECM allows to manufacture such parts meeting the requirements for accuracy of these complex geometries.

BACKGROUND OF THE INVENTION

An ECM apparatus that is described in U.S. Pat. No. 7,479,214 includes a stationary cathode tool having a passage, and a drive mechanism for moving a bar-shaped workpiece through the passage of the cathode tool while simultaneously rotating the workpiece. Electrolyte flows, from a manifold on one end of the cathodic tool to a manifold at the other end, through the passage, between the wall of the passage and the workpiece. An electric current is simultaneously established in the electrolyte, between the wall of the passage and the workpiece. The internal shape of the cathodic tool wall has a gradual transition from a circular entry opening to a lobed exit opening, and lobes formed in the wall of the tool are shaped so that they twist in the direction of workpiece rotation, in order to form helical lobes in the workpiece.

The issue with this design is the high power consumption that is directly related to the amount of metal that the process has to dissolve to get the finished shape for the workpiece from the initial blank. By making use of the teaching of U.S. Pat. No. 7,479,214, all the metal outside the final shape has to be dissolved. The need to dissolve this much metal not only causes the high power requirements but also affects the speed at which the workpiece can be advanced through the electrode.

The present invention uses a similar ECM process as taught by U.S. Pat. No. 7,479,214 but reduces the power requirements in a variety of ways. The principle way this result is achieved is to use an electrode that has a much smaller thickness than the maximum thickness of the part that is to be cut away from the workpiece. The electrode can be shaped in various ways including open shapes or closed shapes like rings, for example. The electrode might be hollow or might have at least passages through which the electrolyte is delivered through openings in the electrode that can be at a leading end in the direction of electrode movement with respect to the workpiece to be machined. Alternatively, the outlets for the electrolyte can be on or in or near other surfaces of the electrode or the electrolyte might be directed with seals or other appropriate means to a part of the electrode for dissolving and removing a narrow band of metal to cut into the workpiece. The electrode can be rotated or otherwise moved with respect to the workpiece to create a desired shape of the cut as it is axially advanced, e.g. to create a desired pitch. The electrode can have lobe shapes which might be already inclined for a desired pitch. By using an electrode with lobe shapes, it is a function of controlling the axial speed and rate of rotation to get the desired lobe profile on the workpiece that is being machined.

Also related to ECM are U.S. Pat. Nos. 6,250,340; 6,413,407; 7,192,260; 5,310,468; 5,244,548; 5,149,405 and 6,309,195.

SUMMARY OF THE INVENTION

An ECM method involves the use of an electrode having a relatively small profile with electrolyte delivered through openings in or near the surface of the electrode and that is advanced relative to the workpiece. The profile of the electrode that is relatively small compared to the part of the workpiece that is to be removed results in a minimal dissolution of metal while forming the desired cut. The relatively small electrode profile allows significant power consumption reduction or increased machining speed for a given rate of power input compared to the prior art. The electrode can be a unitary closed shape or can be made of segments. Electrode segments might be placed adjacent to each other so that a continuous shape is cut. However, not all details have to be cut in the same pass. Electrode segments can be used to sequentially create the desired shape details in separate passes. Parts of the electrode may be slanted with respect to the direction of movement to get the desired shape or they can be parallel with the direction of movement. A desired pitch may be produced that way by a combination of translational and rotational movement. The produced profiles can have all kind of shapes. In particular, they do not need to be rotationally symmetric.

DETAILED DESCRIPTION OF THE PREFERRED EMBODIMENT

In the examples and illustrations herein, apparatuses and methods are discussed for electrochemical machining of parts with reduced power consumption compared to the prior art of electrochemical machining. The teachings are in particular beneficial for the manufacturing of elongated parts. Elongated parts are defined by having a first dimension significant longer than the other two dimensions perpendicular to the first dimension. The examples and illustrations provided in this patent application are dealing with the manufacturing of a rotor and a stator of a hydraulic motor or a progressing cavity pump which are examples for elongated parts with a complex geometry. The outer or inner geometry of the rotor or stator may comprise symmetrically or asymmetrically twisted lobes that are shapes which are challenging to manufacture with the required accuracy by conventional methods (milling for example). However, these examples are not meant as a limitation. Those skilled in the art will appreciate that the teachings disclosed herein can be used to manufacture other parts with a different use than rotors or stators that are described here to illustrate the invention.

Figure 1:
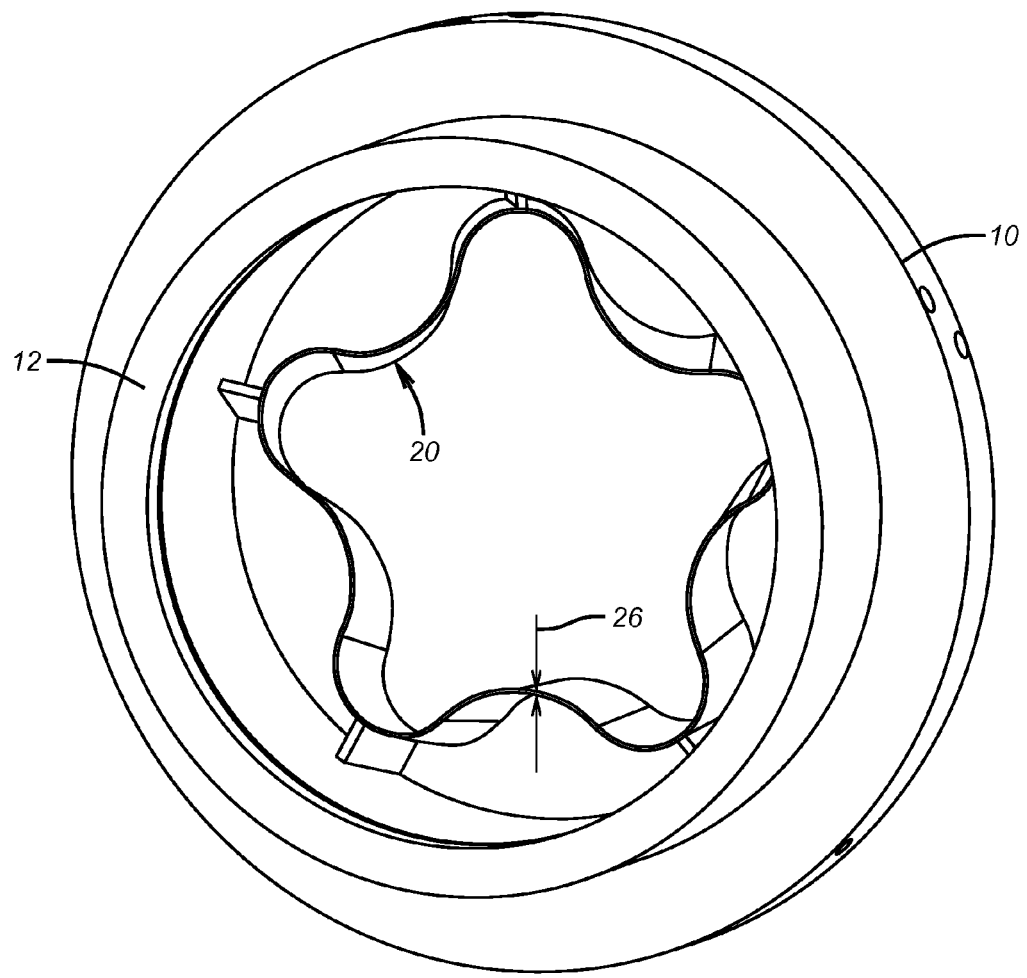
FIG. 1 is a perspective view of the leading end of an electrode and holder to manufacture a rotor.
Figure 2:
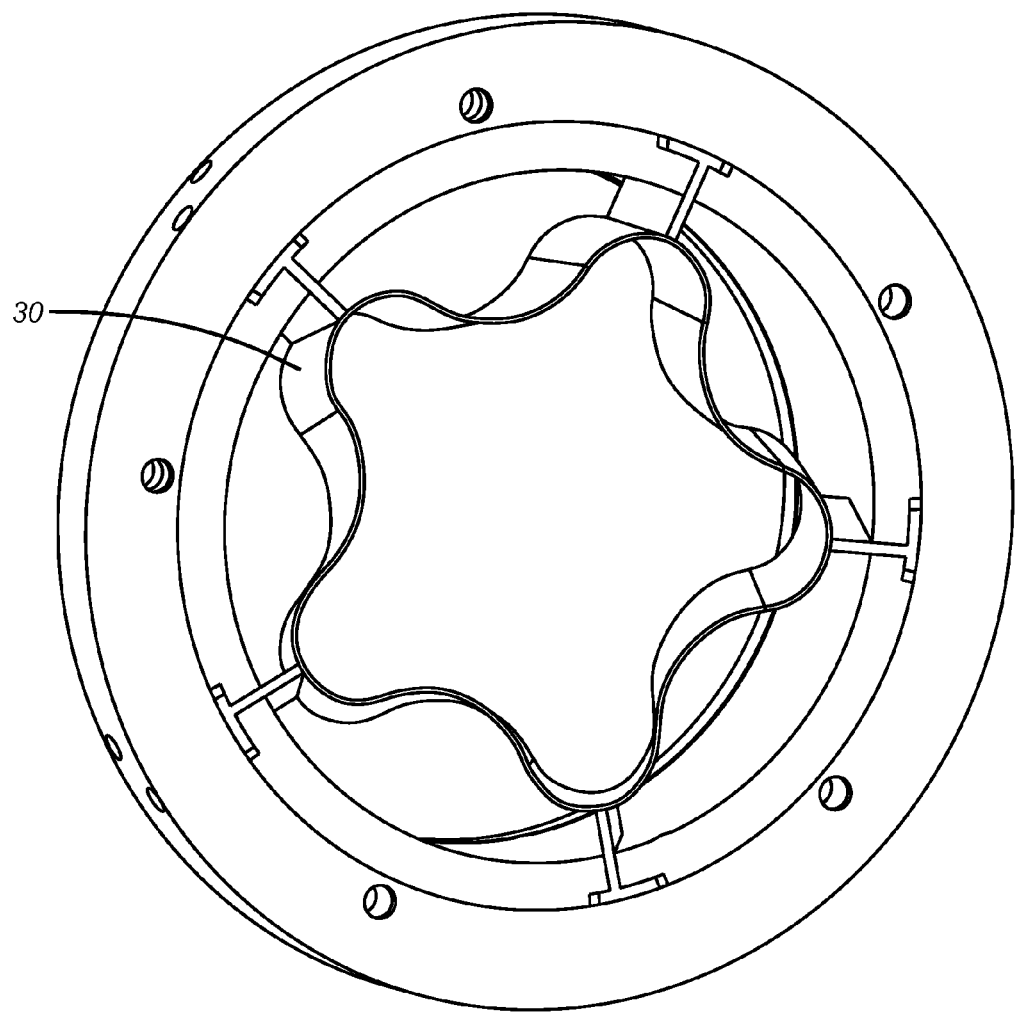
FIG. 2 is a perspective view of the trailing end of the electrode and holder of FIG. 1.
Figure 3:
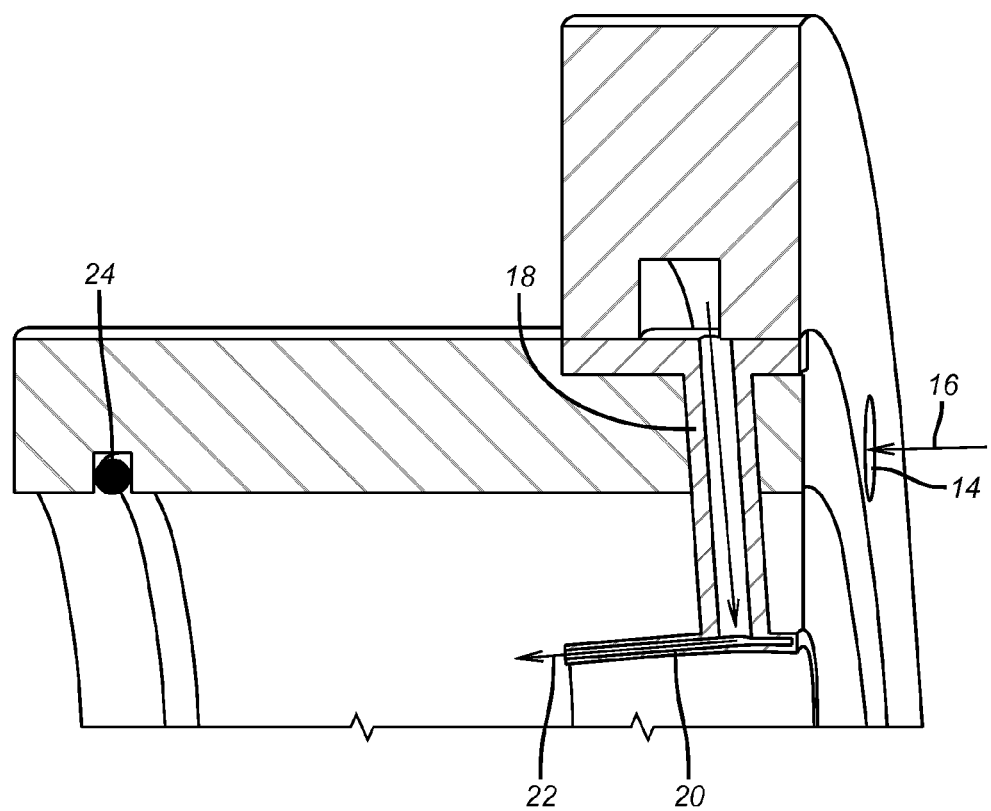
FIG. 3 is a section through the FIG. 1 electrode and holder to show the electrolyte flow passages.
Figure 5:
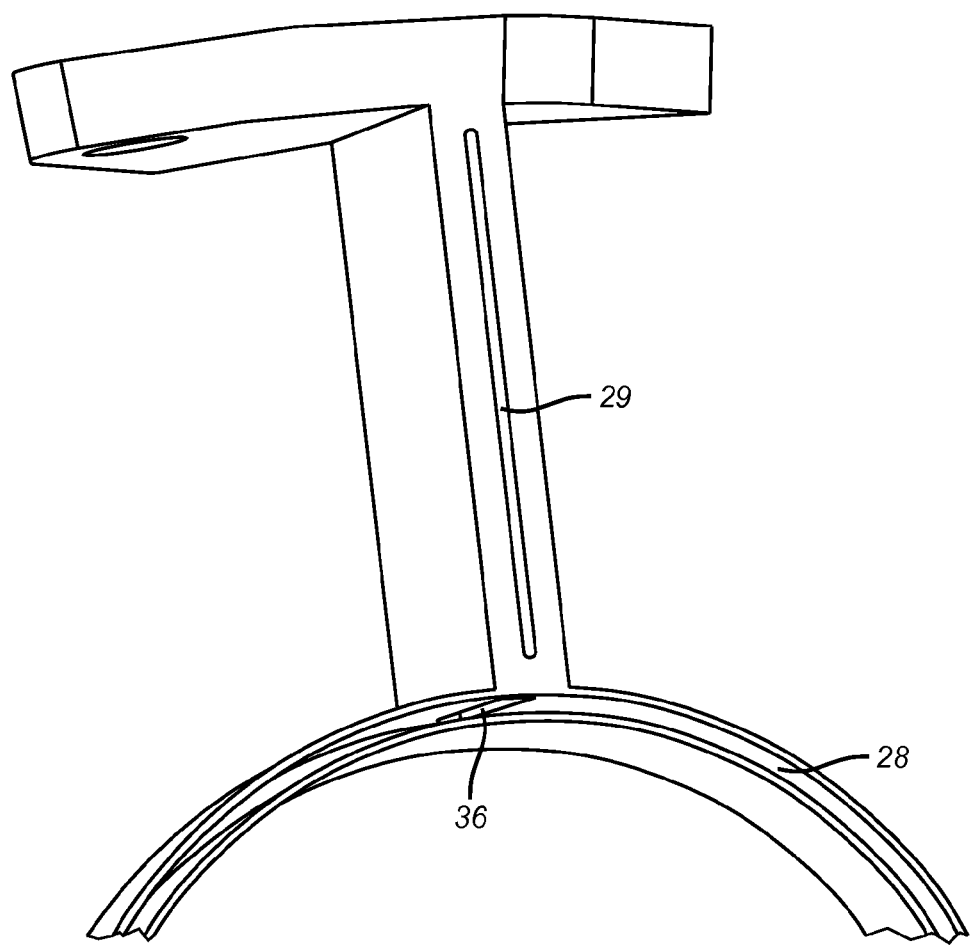
FIG. 5 is a detailed view of a part of the FIG. 1 electrode with one of the supports.
Figure 6:
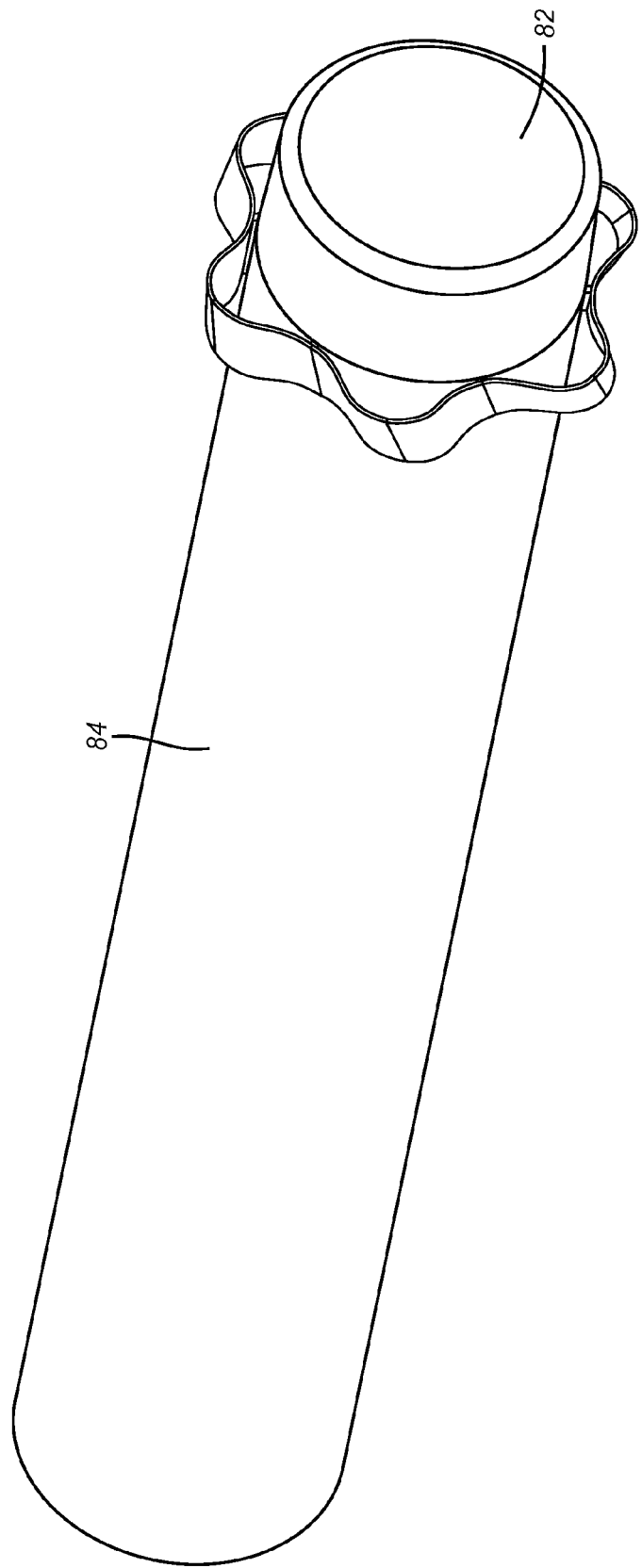
FIG. 6 is a perspective view of an assembly for an electrode for making stators.

Referring to FIG. 1 the electrode holder 10 has a circular inlet guide 12 for the workpiece that is not shown to enter so that the holder 10 can be axially advanced and otherwise moved as the electrolyte represented by arrow 16 (FIG. 3) enters inlets 14 (FIG. 3). Referring to FIG. 3, the electrolyte path is from inlets 14 through supports 18 and into the electrode 20 and out the leading end of the electrode 20 as represented by arrow 22. A seal 24 engages the workpiece that is not shown as the shape of the electrode is cut into the workpiece to eventually cut away one or more excess pieces for making elongated parts like a rotor or a stator. While not shown in the figures, parts of the electrode 20 might be electrically isolated so as to steer the electric field in a way to keep power consumption low and to avoid dissolution at locations where it is not desired. The basic method of ECM is well known but the difference of the proposed method in producing elongated parts like a rotor or a stator involves the use of a relatively thin profile for the electrode 20 that is preferably hollow to handle the electrolyte flow until the leading end exit 28 as best seen in FIG. 5. For the scope of this patent application a relatively thin electrode 20 is defined by an electrode 20 with a thickness 26 (FIG. 1) that is smaller than the maximum thickness of the part that is to be cut away from the workpiece. While not shown in the figures, the electrode length in the direction of the relative movement between electrode and workpiece can be in the same range as the thickness 26 of the electrode. This can have significant benefits in terms of steerability of the electrode during the relative movement between electrode and workpiece. The term "hollow" as used in this application includes any type of passage through the electrode that allows to deliver electrolyte next to the electrolyte. A hollow electrode, therefore, includes bores in the electrode, electrodes made of porous material, gaps inbetween two electrode wings, etc. In the preferred embodiment, the cross section of the electrode 20 has a shape similar to the surface contour that will be produced with the electrode 20. In the case of a rotor or a stator the electrode 20 might have multiple lobes 30 (FIG. 2). The lobes might be understood to comprise an undulating radius along the circumference of the workpiece. The lines connecting the radius maxima substantially along the individual lobe are skewed with respect to the axis of translational movement of the electrode shape 20 such that axial advancement of the electrode 20 coupled with rotation results in the production of continuous lobes that have a desired pitch around the remaining part of the workpiece. While the figures show such a skewed electrode, the electrode can also be designed such that it does not have any inherent direction. For instance, the electrode could be made with a substantially cylindrical cross section or any other cross section in a plane perpendicular to the movement of the workpiece. The gap that is created by the metal that is dissolved and removed is about as wide as the thickness 26 of the electrode 20 so that the electrode 20 can advance relative to the workpiece.

Figure 4:
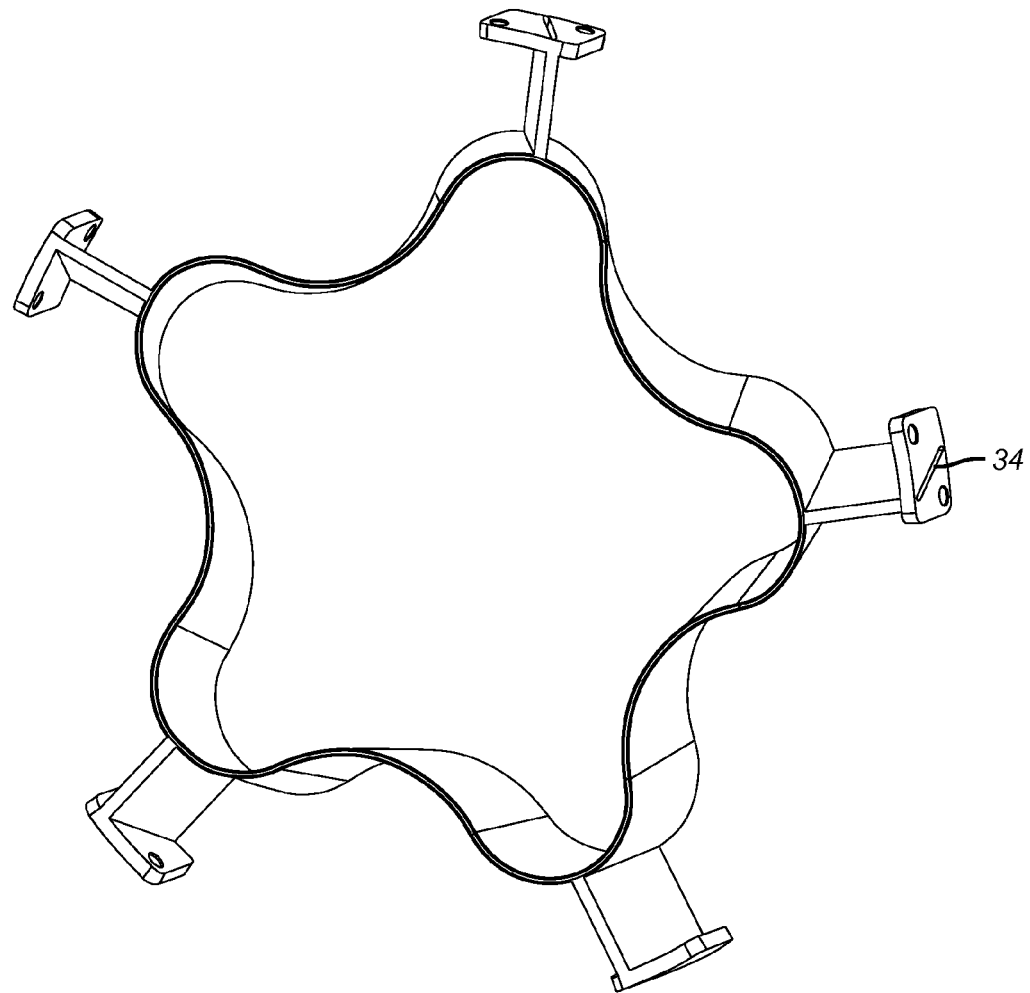
FIG. 4 is the electrode of FIG. 1 without the holder.

While the electrode 20 can be axially advanced and turned with respect to the workpiece, it should be recognized that the workpiece can also be advanced and turned relative to a stationary electrode 20 to make the required cut. It is also possible that either one is turned and the other one is advanced and finally both can be advanced and turned as long as a relative movement and rotation between the two parts is created. Either one of these motions can be active or passive. As an example, by using a trailing guide section behind the electrode 20, the rotation will be caused by the axial advancement. Alternatively, such a trailing guide section can be used in a way that the translational movement will be caused by the rotational movement. Those skilled in the art will appreciate that there are many other possibilities to create the axial and rotational movement with or without the use of a trailing guide section. The supports 18 (FIG. 3) are hollow and flow represented by arrow 16 (FIG. 3) enters inflow opening 34 in the support 18 to get inside the electrode 20. Once entering through inflow opening 34 (FIG. 4) the flow then exits through outflow opening 36 (FIG. 5) and the body of the electrode 20. While FIG. 4 shows an inflow opening 34 in each support 18 (FIG. 3) it is obvious for those skilled in the art that not all of the supports 18 need to have an inflow opening 34 (FIG. 4). The electrolyte is collected and recirculated as will be more fully explained below. As in an conventional ECM systems there may be cooling systems and insulating materials to separate the anode and cathode as the metal is removed when the current is applied. Such electrodes can be manufactured by various methods including but not limited to 3D printing such as additive manufacturing, selective laser melting, or direct laser metal sintering.

While the closed shape for the electrode 20 is preferred in particular for the manufacturing of a rotor or a stator, it might be advantageous to use an electrode comprising one or more discrete electrode segments (not shown). An electrode segment covers only a part of the circumference of the workpiece. At least one of the electrode segments is hollow or otherwise allows electrolyte flow in a similar manner than the unitary electrode. Electrode segments might be adjacent to each other. However, it might be useful to use only one electrode segment or to use more than one electrode segments that are not adjacent to create a desired cut.

Whichever configuration of the electrode is used, the entire length of the workpiece is not necessarily formed in a single pass. For example, the machining can be interrupted to allow other processes, for example to physically remove the excess material that may have been cut loose from the workpiece, to exchange electrodes, to modify position of electrode or electrode segments (such as rotating), to otherwise machine the workpiece, or to execute further processing steps. The excess material can be removed and the machining process restarted, if necessary. The electrochemical machining process can be combined with other machining processes such as a milling process to come to the desired shape of the workpiece.

Whether closed shape electrode or one or more electrode segments are used and whether the electrochemical machining is done in one or more than one passes, the final cut that is created can cover the complete circumference of the workpiece or can cover only a part of the workpiece circumference. For example, by adjacent electrode segments, a structure similar to a closed shape structure can be created in one or more passes. Such a structure of adjacent segments can be used to machine the complete circumference of a workpiece. Alternatively, by using more than one non-adjacent electrode segments, it is possible to cover the full circumference of the workpiece even in a single pass if the electrode segments have some distance to each other along the axis of relative movement between workpiece and electrode. Those skilled in the art will appreciate that all other combinations of closed electrodes versus electrode segments, adjacent versus non-adjacent electrodes, and single pass versus multiple passes are possible to create either a cut that covers either the complete circumference of the workpiece or only a part of the circumference of the workpiece.

Figure 7:
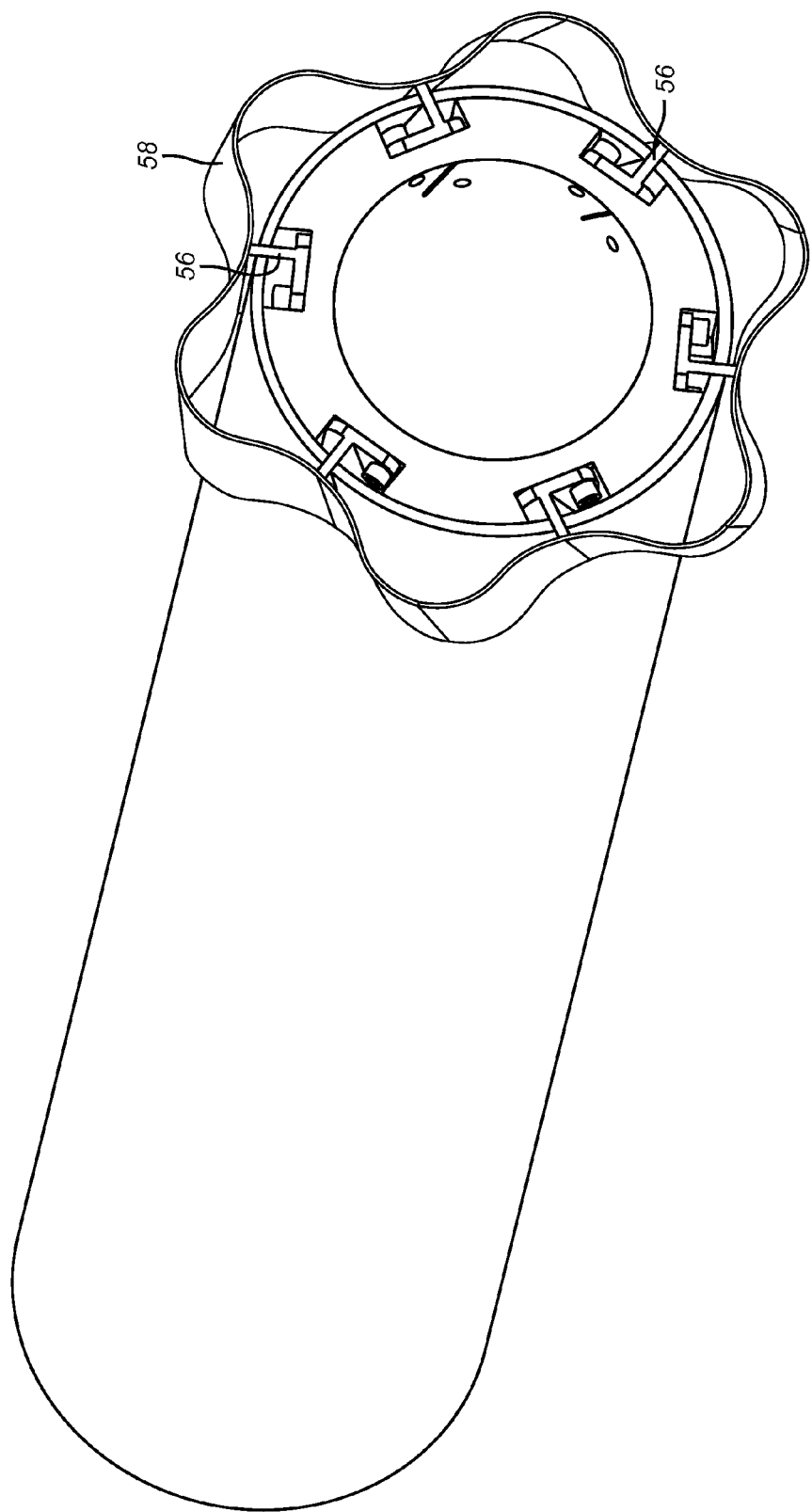
FIG. 7 is the view of FIG. 6 with the guide removed from within the shaft.
Figure 8:
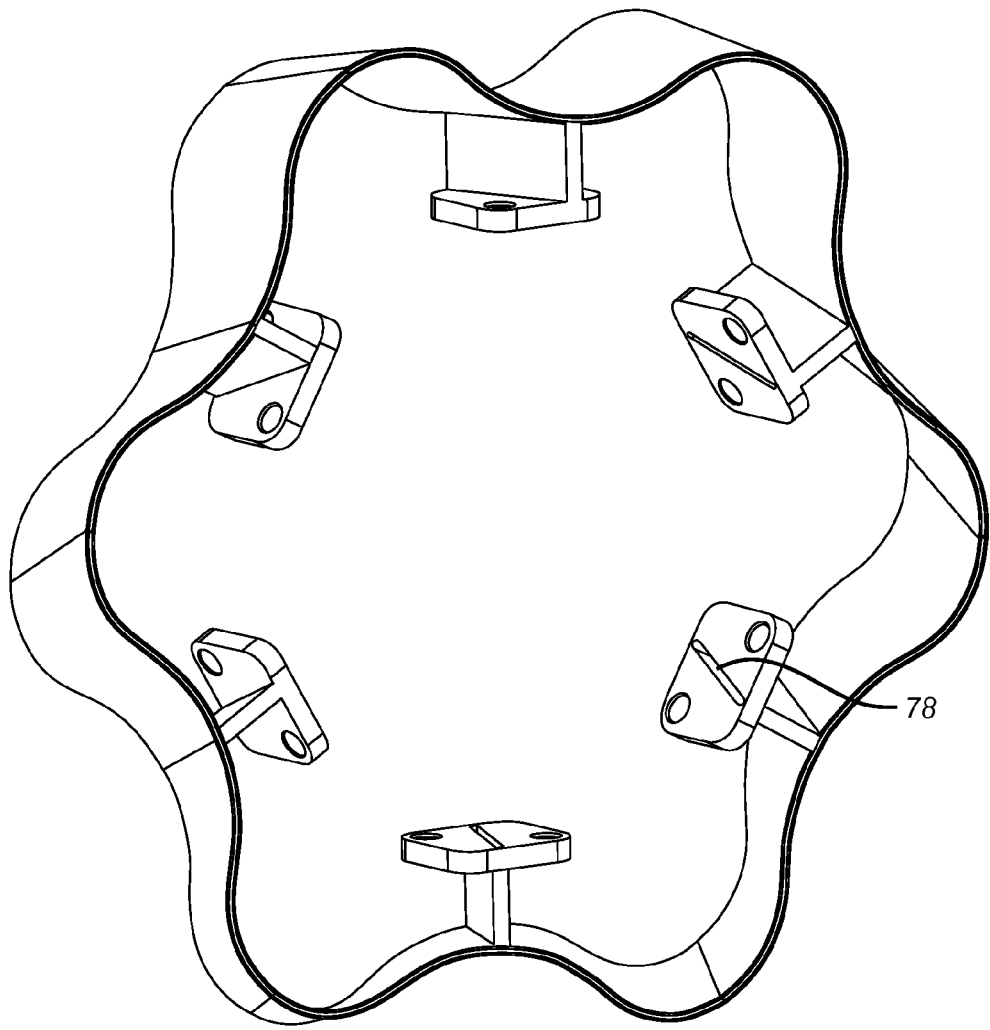
FIG. 8 is a perspective view of the FIG. 6 electrode showing the electrolyte entrances from the shaft.
Figure 9:
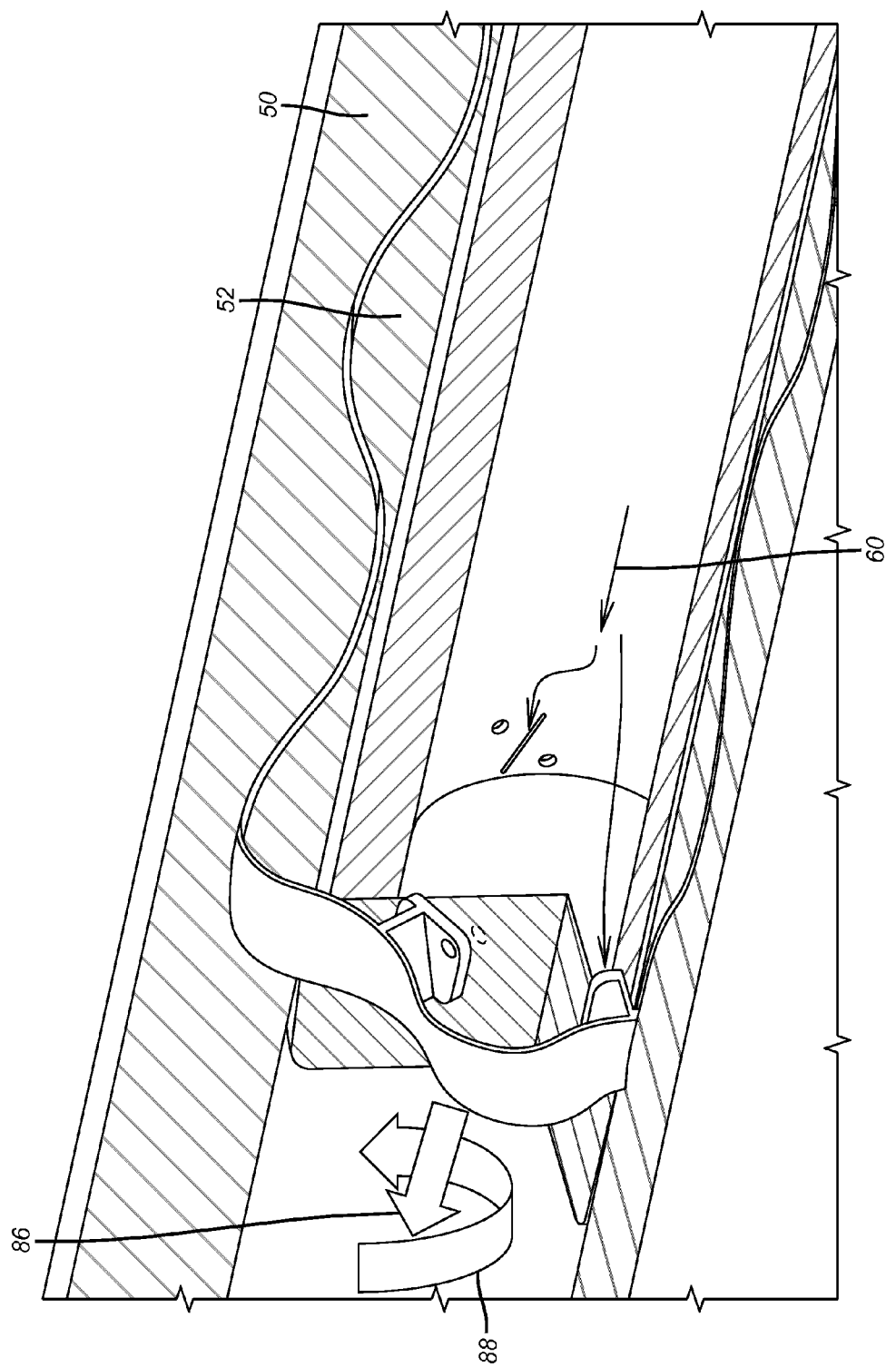
FIG. 9 is a part cutaway showing the stator being cut.
Figure 10:
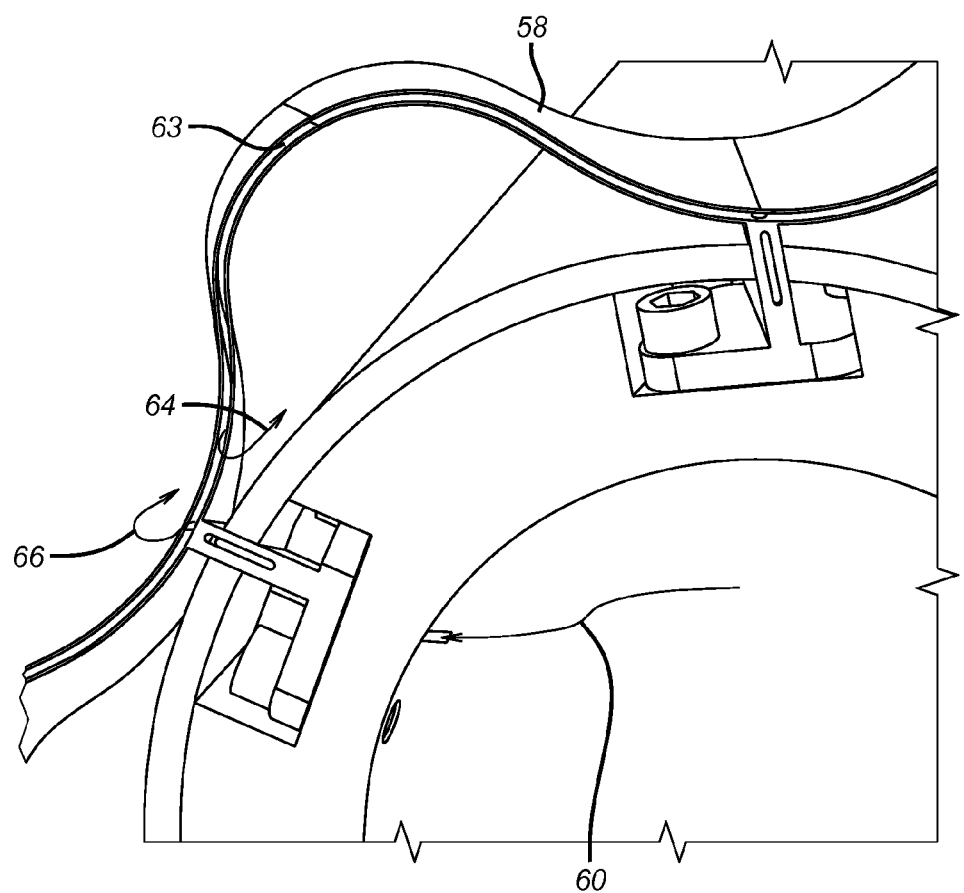
FIG. 10 is a close-up of the arrangement shown in FIG. 9 view showing the electrolyte feed to the electrode.
Figure 11:
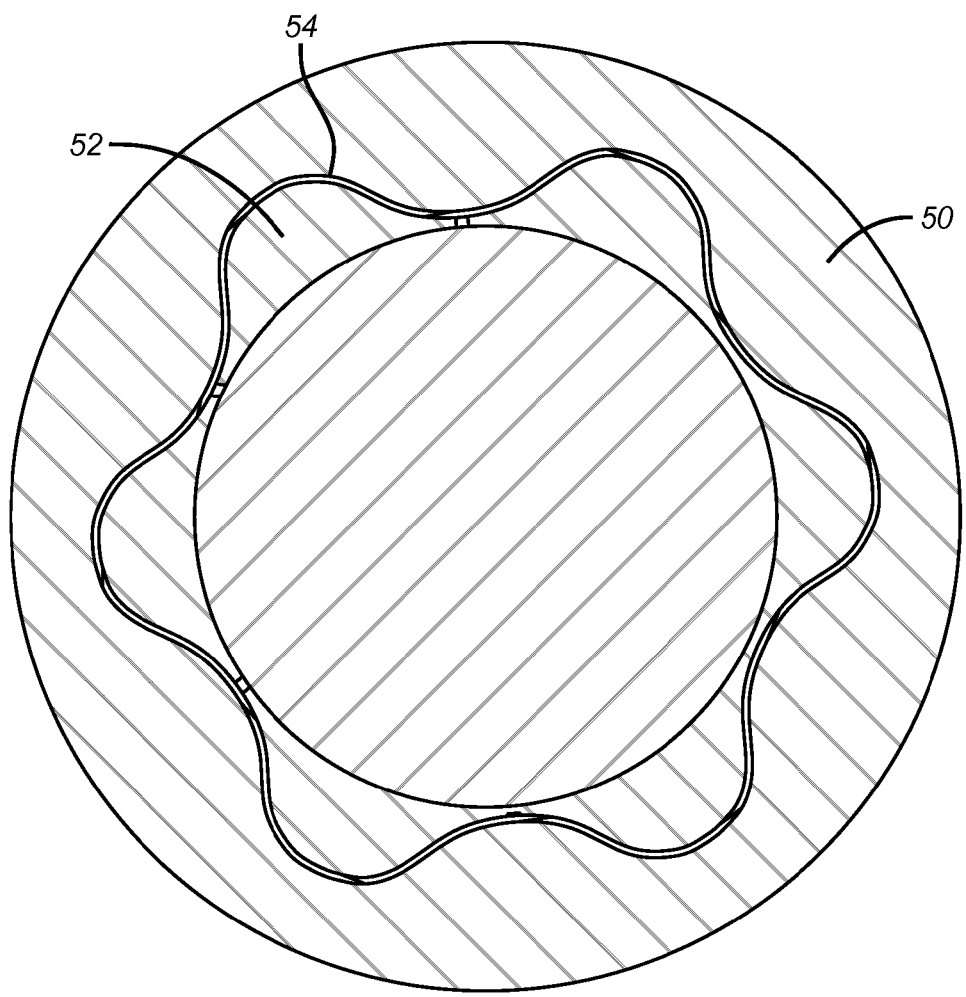
FIG. 11 is a section view of the workpiece shown in FIG. 9 showing the resulting stator and the excess material cut away from the workpiece.

FIGS. 6-10 show how an inner contour can be produced by cutting away an inner excess piece. The cutting plane can have various even irregular shapes. In the examples of FIGS. 6-10, the manufacturing of a stator 50 (FIGS. 9, 11) by cutting away an inner excess piece 52 (FIG. 11) along an undulating line 54 (FIG. 11) is illustrated. For the stator manufacturing, the supports 56 (FIG. 7) are on the inside of the electrode 58 and electrolyte flow represented by arrow 60 (FIG. 10) passes through a shaft (see FIG. 7) on the way to the supports 56. As before, the electrolyte flow 60 (FIG. 10) goes through the hollow passage 63 (FIG. 10) of the electrode 58 (FIG. 7) and out and back around the inside or the outside of the electrode 58 as represented by arrows 64 (FIG. 10) and 66 (FIG. 10). The electrolyte flow represented by arrow 60 (FIG. 10) goes into openings 78 (FIG. 8) in supports 56 (FIG. 7). While FIG. 8 shows an opening 78 in each support 56 it is obvious for those skilled in the art that not all of the supports 56 need to have an opening 78. Supports 56 (FIG. 7) are fixed to shaft (see FIG. 7) that is a hollow shaft for electrolyte delivery. The shaft will be used to support the electrode 58 (FIG. 7) and to convey force or movement to the electrode 58 to create the relative movement of the electrode 58 and the workpiece. The shaft may also house equipment to power the electrode (wires or electronic components for example—not shown). An inner guide 82 (FIG. 6) may be placed inside the tubular workpiece when making an inner contour like a stator. The guide is close in dimension to the inner diameter of the stator workpiece to guide the relative movement of the workpiece and the electrode. In addition or alternatively, the shaft may guide the relative movement of the workpiece and the electrode. The shaft and the inner guide 82 (FIG. 6) may be insulated with a cover 84 (FIG. 6) to electrically isolate metallic parts inside the insulation from the workpiece and the inner excess piece 52 (FIG. 11) that is removed from the workpiece to leave what will be the stator 50 (FIG. 11). As with the production of the rotor, when making the stator, the electrode 58 (FIG. 7) is axially advanced as shown with arrow 86 (FIG. 9) and rotated as shown by arrow 88 (FIG. 9). Beyond that the variations described above with regard to making the stator are applicable to the making of the corresponding rotor.

The lobes for the rotor and stator do not have to have a specific shape but can have various shapes with all kinds of variation. Also, more than one electrode might be used consecutively. Also, while shown in the figures that the lobes in electrodes for manufacturing rotors or stators are each supported by a single support 18 (FIG. 3) or 56 (FIG. 7), the number of the supports can be lower or higher than the number of the number of the lobes.

Those skilled in the art will appreciate that significant reductions in power consumption can be achieved because only a narrow sliver of metal is removed when making the rotor or the stator by virtue of the use of the narrow electrode. The electrolyte can meet the workpiece through leading openings in the electrode or with inside or outside openings with seals to redirect the flow to the leading end of the advancing electrode. The electrode can be unitary or in one piece or it can be made of abutting or non-abutting segments. In either case the stator or rotor with all its lobes will be made at one pass. Alternatively, some segments can be used for the electrode in which case less than all the lobes will be made in a single pass. The pass can be interrupted before the finished length is produced and the excess cut away material can be removed. After such removal the cutting can continue to finish the required length. The whole length of a workpiece does not need to be cut but could leave, for example, a section for further installations such as mounting one or more bearings or if additional length of the workpiece is desired for machining of the workpiece.

When making a stator, the electrode cuts through the workpiece to leave an excess piece or pieces on the interior of the workpiece. On the other hand when making a rotor the electrode cuts through the workpiece leaving an exterior excess piece. The power savings comes into play because the excess piece is created with a thin cutting of the workpiece rather than using ECM to completely dissolve the excess portion from the workpiece and leaving behind only the finished rotor or stator. The power savings results from the elimination of the machining of the entire excess portion and replacing such machining with a thin cut made by the electrode during relative movement with respect to the workpiece. The cut height is just slightly larger than the electrode height to allow the electrode to advance as the shape of the rotor or stator is cut while leaving behind an excess piece to be discarded.

The above description is illustrative of the preferred embodiment and many modifications may be made by those skilled in the art without departing from the invention whose scope is to be determined from the literal and equivalent scope of the claims below:

We claim:

1. An electrochemical manufacturing method, comprising:

providing at least one continuously extending closed shaped electrode defining an opening therethrough and further comprising at least one lobe skewed with respect to an axis of a relative axial movement of said closed shaped electrode with respect to a workpiece, a relative rotation of said closed shaped electrode relative to said workpiece coupled with said relative axial movement results in the production of at least one continuous lobe that has a desired pitch on the workpiece, said opening being smaller at least in part than an initial outermost workpiece periphery such that relatively rotating and relatively axially moving said electrode within the initial outermost workpiece periphery to make a continuous axial cut along a longitudinal axis of the workpiece removes from an outermost initial peripheral portion of the workpiece at least one separable excess piece located outside said closed shaped electrode thus defining a finished outermost workpiece periphery which is smaller than said initial outermost workpiece periphery; or providing at least one continuously extending closed shaped electrode defining an opening therethrough and further comprising at least one lobe skewed with respect to an axis of a relative axial movement of said closed shaped electrode with respect to a tubularly shaped workpiece, a relative rotation of said closed shape electrode relative to said workpiece coupled with said relative axial movement results in the production of at least one continuous lobe that has a desired pitch on said workpiece, said opening being larger at least in part than an initial innermost workpiece periphery of a tubularly shaped workpiece such that relatively rotating and relatively axially moving said electrode outside the initial innermost workpiece periphery to make a continuous axial cut along a longitudinal axis of the workpiece removes from an innermost initial peripheral portion of the workpiece at least one separable excess piece located inside said closed shaped electrode thus defining a finished innermost workpiece periphery which is larger than said initial innermost workpiece periphery of the tubularly shaped workpiece; or providing at least one continuously extending closed shaped electrode defining an opening therethrough and further comprising at least one lobe skewed with respect to an axis of a relative axial movement of said closed shaped electrode with respect to a workpiece, a relative rotation of said closed shape electrode relative to said workpiece coupled with said relative axial movement results in the production of at least one continuous lobe that has a desired pitch on the workpiece, said opening being smaller than at least in part than an initial outermost workpiece periphery such that relatively rotating and relatively axially moving said electrode within the initial outermost workpiece periphery to make a continuous axial cut along a longitudinal axis of the workpiece removes from within an outermost initial peripheral portion of the workpiece at least one separable excess piece located inside said closed shaped electrode thus creating a tubular shape with a finished innermost workpiece periphery;

delivering power to said electrode, and electrolyte to said electrode with an electrolyte delivery system;

allowing said electrolyte to cut into said workpiece in a manner that allows the electrode to advance into said cut.

2. The method of claim 1, comprising:
making a rotor or stator for a progressing cavity pump or a mud motor from said workpiece.

3. The method of claim 2, comprising:
creating a rotationally symmetrical rotor or stator with said electrode.

4. The method of claim 1, comprising:
supporting said electrode with a hollow support;
providing power to said hollow support.

5. The method of claim 1, comprising:
making said electrode from two or more segments configured to machine lobes in said workpiece.

6. The method of claim 5, comprising:
making at least one of said segments hollow;
abutting said segments to create a segmented electrode.

7. The method of claim 5, comprising:
making multiple passes of relative movement between said workpiece and said electrode to obtain said machined workpiece.

8. The method of claim 1, comprising:
making multiple passes of relative movement between said workpiece and said electrode.

9. The method of claim 1, comprising:
shaping said electrode to machine lobes in said workpiece;
producing stator or rotor lobes.

10. The method of claim 9, comprising:
producing parts of machines to transform flow energy into mechanical energy or vice versa with said electrode.

11. The method of claim 9, comprising:
orienting lines on said electrode connecting the radius maxima along individual lobes either parallel or skewed to the axis of said movement.

12. The method of claim 1, comprising:
supporting said electrode with hollow supports;
making said electrode hollow;
supplying electrolyte to said hollow electrode through said hollow supports extending from a shaft located within an electrode holder.

13. The method of claim 12, comprising:
sealing between a portion of the workpiece that has yet to be machined and said shaft or said electrode holder to contain said electrolyte for recirculation.

14. The method of claim 1, comprising:
removing at least a portion of said excess piece before said cut is finished.

15. The method of claim 1, wherein:
providing an electrode thickness no greater than a thickness of the excess piece to be cut.

16. An electrochemical manufacturing apparatus, comprising:
at least one continuously extending closed shaped electrode defining an opening therethrough and further comprising at least one lobe skewed with respect to an axis of a relative axial movement of said closed shaped electrode with respect to a workpiece, a relative rotation of said closed shaped electrode relative to said workpiece coupled with said relative axial movement results in the production of at least one continuous lobe that has a desired pitch on the workpiece, said opening being smaller at least in part than an initial outermost workpiece periphery such that relatively rotating and relatively axially moving said electrode within the initial outermost workpiece periphery to make a continuous axial cut along a longitudinal axis of the workpiece removes from an outermost initial peripheral portion of the workpiece at least one separable excess piece located outside said closed shaped electrode thus defining a finished outermost workpiece periphery which is smaller than said initial outermost workpiece periphery; or at least one continuously extending closed shaped electrode defining an opening therethrough and further comprising at least one lobe skewed with respect to an axis of a relative axial movement of said closed shaped electrode with respect to a tubularly shaped workpiece, a relative rotation of said closed shape electrode relative to said workpiece coupled with said relative axial movement results in the production of at least one continuous lobe that has a desired pitch on said workpiece, said opening being larger at least in part than an initial innermost workpiece periphery of said workpiece such that relatively rotating and relatively axially moving said electrode outside the initial innermost workpiece periphery to make a continuous axial cut along a longitudinal axis of the workpiece removes from an innermost initial peripheral portion of the workpiece at least one separable excess piece located inside said closed shaped electrode thus defining a finished innermost workpiece periphery which is larger than said initial innermost workpiece periphery of the workpiece; or at least one continuously extending closed shaped electrode defining an opening therethrough and further comprising at least one lobe skewed with respect to an axis of a relative axial movement of said closed shaped electrode with respect to a workpiece, a relative rotation of said closed shape electrode relative to said workpiece coupled with said relative axial movement results in the production of at least one continuous lobe that has a desired pitch on the workpiece, said opening being smaller at least in part than an initial outermost workpiece periphery such that relatively rotating and relatively axially moving said electrode within the initial outermost workpiece periphery to make a continuous axial cut along a longitudinal axis of the workpiece removes from within an outermost initial peripheral portion of the workpiece at least one separable excess piece located inside said closed shaped electrode thus creating a tubular shape with a finished innermost workpiece periphery;

a power system for said electrode;

an electrolyte delivery system delivering electrolyte adjacent to said electrode to produce said at least one cut;

an advancing element configured to move at least one of said electrode and the workpiece so that said electrode advances into said cut.

17. The apparatus of claim 16, wherein:
said electrode moves relative to a stationary workpiece.

18. The apparatus of claim 16, wherein:
said electrode comprises at least one electrolyte passage therethrough.

19. The apparatus of claim 18, wherein:
at least one hollow support supporting said at least one electrolyte passage extending through said at least one hollow support to at least one electrolyte outlet in said electrode.

20. The apparatus of claim 16, wherein:
said electrode comprises multiple segments.

21. The apparatus of claim 20, wherein:
said multiple segments comprise at least one hollow support extending from a shaft located within an electrode holder.

22. The apparatus of claim 16, wherein:
the length of said electrode in the direction of the movement of said electrode relative to said workpiece is in the same order of magnitude as the thickness of said cut which is created by said electrode.

23. The apparatus of claim 16, further comprising:
at least one electrolyte outlet in said electrode is located at a workpiece facing end or an inside or outside surface of said electrode.

24. The apparatus of claim 23, wherein:
said electrolyte flows along said inside or outside surfaces of said electrode into said cut in said workpiece created by said electrode.

25. The apparatus of claim 23, further comprising:
at least one hollow support supporting said electrode and operatively connected to said electrolyte delivery system and to said power system and further comprising at least one electrolyte outlet.

26. The apparatus of claim 25, wherein:
said electrode supported by said at least one hollow support creates said cut in said workpiece while said hollow support moves relative to said workpiece and said electrolyte is delivered by said electrolyte delivery system.

27. The apparatus of claim 16, wherein:
said electrode is supported by at least one hollow support extending from a shaft located within an electrode holder.

28. The apparatus of claim 27, further comprising:
sealing between a portion of said workpiece and said electrode holder to contain said electrolyte for recirculation.

29. The apparatus of claim 16, wherein:
said electrode is stationary and said workpiece moves.

30. The apparatus of claim 16, wherein:
said electrode having a thickness no greater than a thickness of the excess piece to be cut from the workpiece.

31. An electrochemical manufacturing apparatus, comprising:
a workpiece and at least one electrode configured to move relative to each other;
a power system for said electrode;
an electrolyte delivery system delivering electrolyte adjacent to said electrode;
wherein said electrode creates a cut in said workpiece when an electrolyte is delivered by said electrolyte delivery system, said cut defining a machined workpiece and at least one excess piece from said workpiece;
said electrode comprises multiple segments;
said multiple segments are hollow and abutted to create a hollow closed shaped electrode.

* * * * *